Patented Nov. 8, 1932

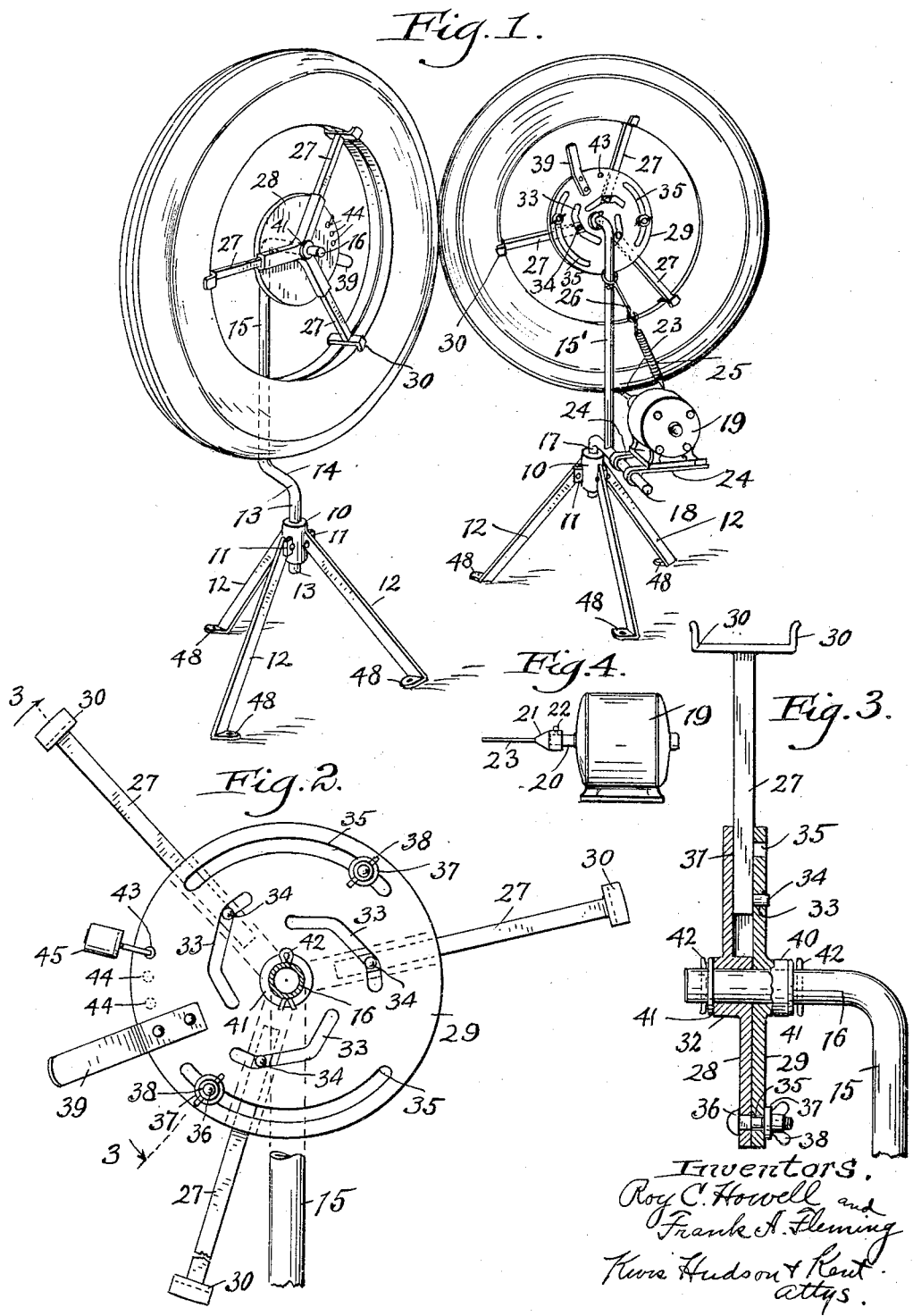

1,886,549

UNITED STATES PATENT OFFICE

ROY C. HOWELL, OF LAKEWOOD, AND FRANK A. FLEMING, OF CLEVELAND, OHIO

TIRE DISPLAY STAND

Application filed June 21, 1929. Serial No. 372,589.

This invention relates to improvements in tire display stands, and particularly to means for quickly mounting a tire for rotation about an axis substantially coincident with the axis of the tire, or demounting it with equal facility, and to a method of displaying a series of tires in which all of the tires are caused to rotate like the gears of a gear train.

One of the objects of the invention is the provision of a simple, inexpensive tire display stand, permitting the rotation of the tire, either by hand or power, in order that the prospective purchaser may be enabled to give the tire a thorough inspection without appreciable physical effort.

Another object is the provision of adjustable tire gripping members, all of which move inwardly and outwardly simultaneously and uniformly, so that the tire is automatically brought to a position concentric with the mounting spindle.

Another object is the provision of simple and convenient means for applying driving power to the tire, which automatically compensates for any out-of-round condition of the tire.

A further object is the provision of simple means for locking the tire mounting elements in order to prevent theft.

Other objects and features of novelty will appear as we proceed with the description of that embodiment of the invention which, for the purposes of the present application, we have illustrated in the accompanying drawing, in which:

Fig. 1 is a perspective view illustrating two display stands embodying the invention, the stands facing in opposite directions and one of them being provided with an electric motor support;

Fig. 2 is an elevational view, on a larger scale, showing the tire carrier in detail;

Fig. 3 is a cross section taken substantially on line 3—3 of Fig. 2; and

Fig. 4 is a side elevation of the motor and its tire rotating element.

In the drawing we have illustrated a base which comprises preferably a hub 10 having bosses 11 to which legs 12 are pivotally connected. These bosses support standards of two somewhat different forms, depending upon whether or not a motor is to be supported. The standard shown at the left in Fig. 1 has a lower vertical portion 13 that extends into the hub 10 and is supported thereby. Above the vertical portion 13 the standard is bent laterally for a distance, as indicated at 14, joining to the portion 13 a second vertical portion 15 of a length substantially equal to the radius of the largest tire for which the stand is designed. At its upper end the standard is again bent to form a horizontal portion constituting a spindle 16 which extends parallel with the portion 14 but is somewhat longer. The material of which the standard is built is preferably iron pipe.

The standard for the motor stand comprises preferably two pieces of iron pipe, the lower piece being bent at right angles to form a vertical portion 17, which enters and is supported by the hub 10 of the base, and a horizontal portion 18. The second piece of pipe in this stand comprises a vertical portion 15', the lower end of which is welded to the portion 18, the distance between the axes of portions 15' and 17 being the same as between the axes of portions 15 and 13 in the other stand. The top end of the pipe 15' is bent down to extend parallel with the portion 18 of the lower pipe to constitute a spindle in a manner precisely the same as in the case of the standard previously described.

19 is an electric motor having a rotor shaft 20. 21 is a rotary element which is bored out at one end to fit over the shaft 20, to which it is secured by a set screw 22. The outer portion 23 of the element 21 is preferably turned down to a very small diameter. This small diameter portion engages the tire tread and constitutes a friction drive for rotating the tire, but owing to its unusually small diameter, as compared with the tire diameter, the rotation of the tire is slow enough not to blur the detail formation of the same as it revolves.

To the bottom of the motor 19 is bolted a pair of metal strips 24 which extend some distance beyond the motor on one side thereof and are rolled up to form eyes that fit over the pipe section 18. In this manner the motor 19 is hingedly or pivotally mounted upon the pipe section 18. The motor is urged upwardly by a coil spring 25, attached to the motor base at a convenient point and provided at its upper end with a hook 26 which extends through a hole or holes in the standard 15'. Thus the rotating element 23 is held against the tread of the tire.

Coming now to the carrier for the tire, this constitutes primarily three radial tire gripping members 27 and two disks 28 and 29 mounted to rotate upon the spindle 16 of the standard 15 or 15', as the case may be. The outer ends of the members 27 may be formed in different ways for engagement with the tire, but in the present instance we have shown them as provided with outturned fingers 30 to straddle the two beads of the tire, as illustrated particularly in Fig. 1.

The members 27 are slidably mounted in radial channel-shaped grooves 31 formed in the disk 28 at the time the latter is cast. At its center the disk 28 has a hub 32 providing a bearing for the disk upon the spindle 16. The inner surface of the disk 28 is flat and continuous except when it is interrupted by the grooves 31. Against this surface the inner surface of the disk 29 engages. The latter disk has three cam slots 33 formed therein, identical in shape, and each adapted to receive a pin 34 that is secured to the inner end of the corresponding member 27. Near the periphery of the disk 29 there are two slots 35 formed along arcs of a circle. Into these slots extend bolts 36 which are mounted in holes in the disk 28. Washers 37 and wing nuts 38 on the threaded ends of the bolts 36 serve, when the nuts are threaded down tightly, to securely clamp these disks together. For convenience in manipulating the device the disk 29 may have a handle 39 welded, riveted, or otherwise secured thereto. The disk 29 also has a hub or bearing portion 40 rotatably mounted upon the spindle 16. When the two disks are clamped together the two hubs 32 and 40 together form a wide bearing for the rotating carrier. On either side of this bearing there are washers 41, and cotter pins 42 are projected through suitable holes in the spindle 16 so as to prevent the carrier from moving off the end of the spindle or from moving too far inwardly. The length of the spindle 16 and the positions of the cotter pins 42 are such that the center of gravity of the tire displaced upon the stand shall lie directly over the center of the base or tripod.

The stand of the present invention is intended for use with several different diameters of tires, for instance three, and in order that it may be possible to lock onto the stand a tire of any one of these diameters, we provide the disk 29 with a single hole 43 and the disk 28 with three holes 44. Any one of the latter may be brought into registration with the hole 43, after which a padlock 45 may be projected through the aligned holes to lock the disks together.

As a further precaution against theft, that is against the theft of a stand with a tire locked thereon, I may bend the lower ends of legs 12 to form feet 48 that are perforated for the reception of fastenings by means of which the stand may be fastened to a floor or pavement.

By means of our invention an attractive display of a considerable number of tires may be provided by the use of a single motor stand and a number of stands like that shown at the left of Fig. 1, all arranged in a series with adjacent tire treads touching each other. Then, when the motor is set in operation, all of the tires will rotate slowly. Display cards of various kinds may, of course, be mounted within the tires, thus concealing the tire carriers.

No matter what the size of the tire may be, that is within the limits of the adjustment provided, it will always be properly centered upon the spindle 16, so that its rotation will be true within practical limits. Such slight flattening or distortion of the tire as may result from the application of pressure by the carrier members 27 to three different points only of the tire, will be compensated for by the resilient mounting of the motor 19.

Having thus described our invention, we claim:

1. In a tire display stand, a spindle, a carrier mounted to rotate upon said spindle, whereby the tire may be turned through any desired angle, and tire gripping arms movable upon said carrier uniformly into tire gripping position, whereby the tire is centered with respect to said spindle, and means for locking the operating means in any one of a series of operative positions.

2. In a tire display stand, a spindle, a carrier mounted to rotate upon said spindle, and tire gripping arms movable upon said carrier uniformly into gripping position, whereby the tire is centered with respect to said spindle, and a power driven rotating element adapted to engage the periphery of a tire thus supported.

3. In a tire display stand, a base, a standard mounted in said base at the center thereof and extending upwardly therefrom in an offset position, the upper end of said standard being turned down to a horizontal position overlying the center of said base, and a tire carrier rotatably mounted upon said horizontal portion of the standard.

4. In a tire display stand, a base, a standard mounted in said base at the center thereof and extending upwardly therefrom in an offset position, the upper end of said standard being turned down to a horizontal position overlying the center of said base, a tire carrier rotatably mounted upon said horizontal portion of the standard, said standard having a horizontal laterally extending arm near its lower end, an electric motor pivotally supported upon said laterally extending arm to one side thereof, the shaft of said motor carrying an element adapted to rotatably engage the tread of the tire supported upon the stand, and resilient means tending to move said motor upwardly on its pivotal support.

5. In a tire display stand, a spindle, a pair of disks rotatably mounted thereon independently with their adjacent surfaces contacting, a plurality of tire gripping arms adjustably mounted in one of said disks for uniform movement inwardly and outwardly, means for actuating said arms comprising cam surfaces carried by the other disk, said disks having holes therethrough, certain of which are adapted to register in various positions of relative adjustment for the reception of a locking means.

In testimony whereof, we hereunto affix our signatures.

ROY C. HOWELL.
FRANK A. FLEMING.